United States Patent
Krauthamer

(10) Patent No.: US 12,248,237 B2
(45) Date of Patent: *Mar. 11, 2025

(54) SHOW EFFECT SYSTEM FOR ATTRACTION SYSTEM

(71) Applicant: Universal City Studios LLC, Universal City, CA (US)

(72) Inventor: Akiva Meir Krauthamer, Ocoee, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,340

(22) Filed: Jan. 26, 2024

(65) Prior Publication Data

US 2024/0168365 A1    May 23, 2024

Related U.S. Application Data

(63) Continuation of application No. 17/684,916, filed on Mar. 2, 2022, now Pat. No. 11,899,348.

(51) Int. Cl.
```
G03B 21/14      (2006.01)
G02B 27/14      (2006.01)
G02B 30/35      (2020.01)
G02B 30/56      (2020.01)
G03B 21/26      (2006.01)
```
(Continued)

(52) U.S. Cl.
CPC ........... *G03B 21/147* (2013.01); *G02B 27/14* (2013.01); *G02B 30/35* (2020.01); *G02B 30/56* (2020.01); *G03B 21/26* (2013.01); *G03B 21/28* (2013.01); *A63G 31/16* (2013.01)

(58) Field of Classification Search
None
See application file for complete search history.

(56) References Cited

U.S. PATENT DOCUMENTS 8,262,226 B2    9/2012  LaDuke et al.
8,692,738 B2    4/2014  Smithwick et al.
(Continued)

FOREIGN PATENT DOCUMENTS

WO    2016124882 A1    8/2016

OTHER PUBLICATIONS

CNET, "Real holograms are finally here! (And they look very cool)," YouTube, Oct. 7, 2021, 5:40 minutes, 1 page https://www.youtube.com/watch?v=70Gtgbsmmg8&t=270s.

(Continued)

*Primary Examiner* — Bao-Luan Q Le
*Assistant Examiner* — Danell L Owens
(74) *Attorney, Agent, or Firm* — Fletcher Yoder P.C.

(57) ABSTRACT

An attraction system of an amusement park includes a viewing area, a virtual area, and a beam splitter. The beam splitter is positioned to enable visibility of a portion of the viewing area through the beam splitter and visibility of a portion of the virtual area via reflection off the beam splitter. The attraction system also includes a controller configured to perform operations. The operations include generating image data that is distorted in correlation to a distortive parameter associated with a first element disposed in the viewing area. The distortive parameter is indicative of a distortion applied by the first element to light interacting with the first element. The operations also include transmitting the image data to cause display of a second element in the virtual area.

20 Claims, 4 Drawing Sheets

(51) Int. Cl.
*G03B 21/28* (2006.01)
*A63G 31/16* (2006.01)

(56) References Cited

U.S. PATENT DOCUMENTS

| | | |
|---|---|---|
| 10,593,102 B2 | 3/2020 | Haseltine et al. |
| 2011/0037952 A1 | 2/2011 | LaDuke et al. |
| 2012/0050687 A1 | 3/2012 | Berry et al. |
| 2016/0266543 A1 | 9/2016 | Crowder et al. |
| 2020/0057311 A1 | 2/2020 | Radel et al. |
| 2020/0211283 A1 | 7/2020 | Krauthamer |
| 2020/0236330 A1 | 7/2020 | Eder et al. |
| 2021/0236952 A1 | 8/2021 | Krauthamer |

OTHER PUBLICATIONS

Takahashi, D., "Light Field Lab shows off SolidLight high-resholographic display," VentureBeat, Oct. 7, 2021, 21 pages, https://venturebeat.com/2021/10/07/light-field-lab-shows-off-solidlight-high-res-holographic-display/.
Fink, C. "How Light Field Makes Holograms Happen," Forbes, Feb. 26, 2020, 7 pages, https://www.forbes.com/sites/charliefink/2020/02/26/how-light-field-makes-holograms-happen/?sh=1aaec84a1936.
PCT/US2023/014331 International Search Report and Written Opinion mailed May 26, 2023.

SHOW EFFECT SYSTEM FOR ATTRACTION SYSTEM

CROSS-REFERENCE TO RELATED APPLICATIONS

This application is a continuation of U.S. patent application Ser. No. 17/684,916, entitled "SHOW EFFECT SYSTEM FOR ATTRACTION SYSTEM," filed Mar. 2, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. With the increasing sophistication and complexity of modern ride attractions, and the corresponding increase in expectations among theme or amusement park patrons, improved and more creative attractions are desirable, including ride attractions having more complex, immersive, and/or realistic special effects.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an attraction system of an amusement park includes a viewing area, a virtual area, and a beam splitter. The beam splitter is positioned to enable visibility of a portion of the viewing area through the beam splitter and visibility of a portion of the virtual area via reflection off the beam splitter. The attraction system also includes a controller configured to perform operations. The operations include generating image data that is distorted in correlation to a distortive parameter associated with a first element disposed in the viewing area. The distortive parameter is indicative of a distortion applied by the first element to light interacting with the first element. The operations also include transmitting the image data to cause display of a second element in the virtual area.

In one embodiment, a non-transitory computer-readable medium, having instructions that, when executed by processing circuitry, are configured to cause the processing circuitry to perform operations. The operations include determining a distortive parameter associated with a physical object disposed within a viewing area of a Pepper's Ghost system. The physical object is visible through a beam splitter of the Pepper's Ghost system, and the distortive parameter is indicative of a distortion applied to light interacting with the physical object. The operations also include generating image data based on the distortive parameter. The operations also include transmitting the image data to display a digital element in a virtual area of the Pepper's Ghost system. The reflected imagery of the digital element is visible via the beam splitter.

In one embodiment, a method for operating a Pepper's Ghost effect system includes receiving, via a processor, image data. The method also includes determining, via the processor, a distortive parameter associated with a physical object disposed in a viewing area. The method also includes adjusting, via the processor, the image data based on the distortive parameter and projecting the image data from a virtual area onto a beam splitter such that corresponding display of reflected imagery of the image data is provided on the beam splitter in alignment with the physical object. The beam splitter is positioned between the viewing area and an observation area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
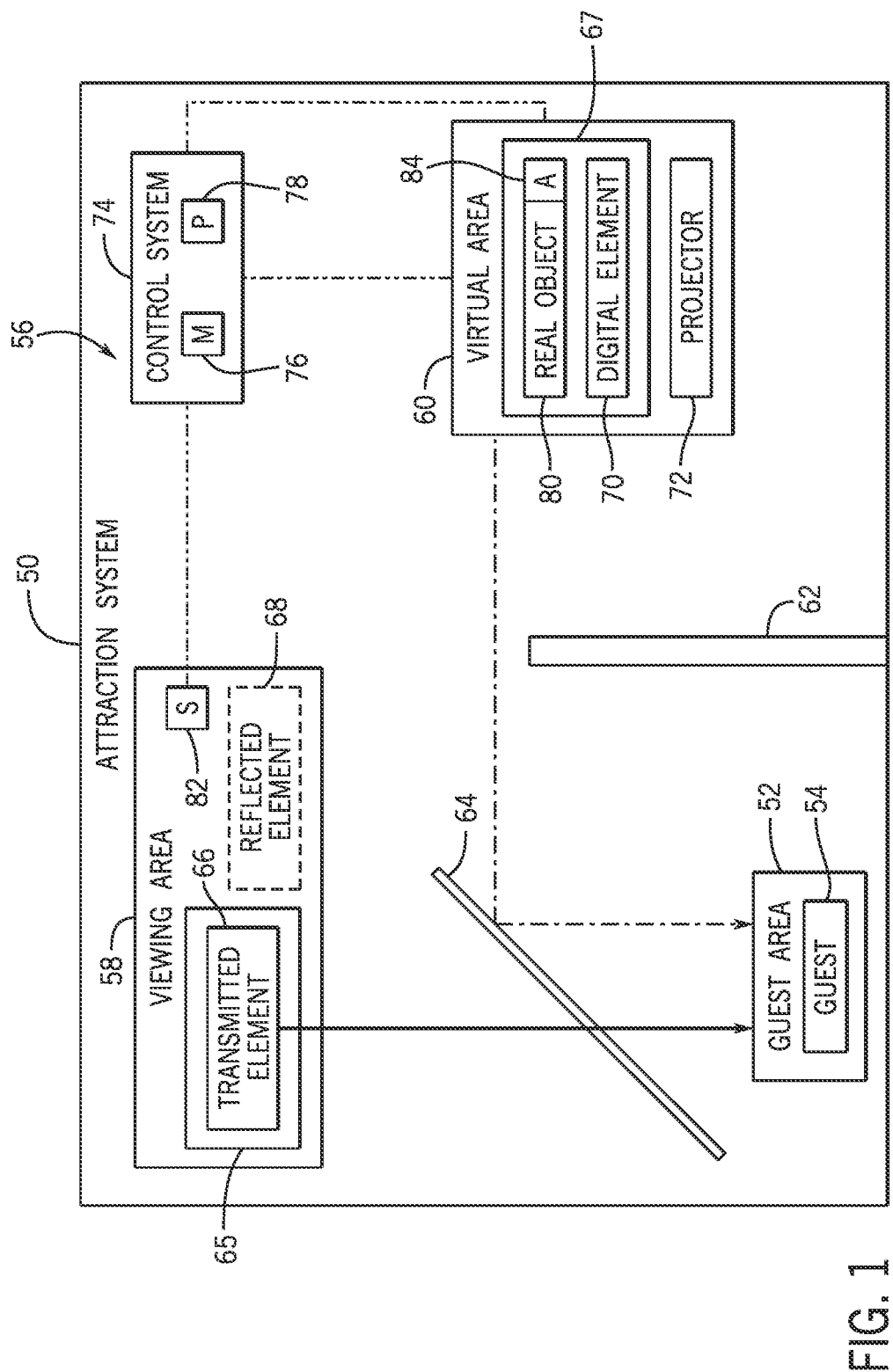
FIG. 1 is a schematic diagram of an embodiment of an attraction system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to providing show effects for an amusement or theme park. The amusement park may include a variety of features, such as rides (e.g., a roller coaster), theatrical shows, set designs, performers, and/or decoration elements, to entertain guests. Show effects may be used to supplement or complement the features, such as to provide the guests with a more immersive and/or unique experience. For example, the show effects may be presented to emulate real world elements in order to present a more realistic atmosphere for the guests.

The attraction system may utilize a show effect system configured to present virtual or simulated objects that may supplement the appearance of real world objects via a Pepper's Ghost system. A traditional Pepper's Ghost system may employ a primary area (e.g., a background scene, a first stage), a secondary area (e.g., an augmented reality scene, a second scene), and an optical beam splitter (e.g., glass). The optical beam splitter may be arranged to enable transmission of imagery of the primary area to enable a guest of the attraction system to view the imagery of the primary area through the optical beam splitter. The optical beam splitter may also reflect imagery from the secondary area toward the guest to enable the guest to view the reflected imagery of the secondary area. As such, the guest may observe imagery from the primary area (e.g., real imagery transmitted from the primary area through the optical beam splitter) and imagery from the secondary area (e.g., virtual imagery reflected from the secondary area off the optical beam splitter) that are combined, superimposed, or overlaid with respect to one another via the optical beam splitter. Additionally, the show effect system may include lighting to illuminate aspects of the combined imagery while blocking illumination of the optical beam splitter. As such, the show effect system may realistically portray elements of the secondary area such that a viewer perceives them as physically present in the primary area.

Embodiments of the present disclosure are directed to improving operation of a show effect system utilizing Pepper's Ghost-based technique to provide a more realistic portrayal of combined elements of a secondary area and elements of a primary area, as those areas are described above. In particular, imagery of the elements of the secondary area (e.g., imagery on a display, such as a television) may be adjusted or manipulated to portray distortion, alteration, and/or interaction via the objects from the primary area in order to achieve more realism with respect to reflective and/or refractive objects. In an embodiment, a first element (e.g., a real object) of the primary area may include a property, such as a refractive index, that distorts an appearance of an object viewed through the first element. In order to more realistically portray that a second element of the secondary area is physically positioned in the primary area, such as behind the first element of the primary area with respect to a perspective of the guest, an appearance of the second element may be distorted in accordance with the property of the first element. In other words, the appearance of the second element may appear to be distorted by the property of the first element to portray that the element of the secondary area is being seen through the element of the primary area. Thus, the first element and the second element appear to interact with one another to portray physical positioning with respect to one another. In one embodiment, the second element of the secondary area may be digitally generated, and the rendering of the second element may be generated to incorporate the distortion based on the first element. For example, a position of the first element and a position of the reflected imagery of the second element (e.g., as seen from the perspective of the guest) may be determined in order to generate and distort the appearance of the second element. The distorted appearance of the second element of the secondary area may establish the realistic appearance (illusion) that each of the first element and the second element are physically positioned in the primary area, thereby providing a more realistic show effect to the guest than is achieved without the distortion.

With the preceding in mind, FIG. 1 is a schematic diagram of an embodiment of an attraction system 50. The attraction system 50 may include a guest area 52 where one or more guests 54 of the attraction system 50 may be positioned. As an example, the guest area 52 may include a path (e.g., a walkway, a queue, a line) through which the guest(s) 54 may navigate. As another example, the guest area 52 may include a space (e.g., a seating area) where the guest(s) 54 may be positioned to view a performance. As a further example, the guest area 52 may include a ride vehicle that may move and carry the guest(s) 54 throughout the attraction system 50.

Furthermore, the attraction system 50 may include a show effect system 56 (e.g., a Pepper's Ghost system) that may provide entertainment to the guest(s) 54 located in the guest area 52. For example, the show effect system 56 may create visual effects that are viewable by the guest(s) 54. In an embodiment, the show effect system 56 may include a viewing area 58 (e.g., a primary area, a background scene) that the guest(s) 54 may view from the guest area 52. As an example, the viewing area 58 may include a stage where a physical object (e.g., a performer, a prop) may be positioned and/or a display screen where an image may be projected. The show effect system 56 may also include a virtual area 60 (e.g., a secondary area, an augmented reality scene) that may not be directly visible to the guest(s) 54 from the guest area 52. For instance, a partition 62 (e.g., a wall, a panel, a screen) may be positioned to block the guest(s) 54 from directly seeing the virtual area 60 from the guest area 52. In an embodiment, the virtual area 60 may be elevated and positioned behind or over the guest area 52. Similarly, the virtual area 60 may be positioned underneath or in a recess relative to the guest area 52.

Additionally, the show effect system 56 may include a beam splitter or partially reflective surface 64 positioned to combine imagery from the viewing area 58 with imagery from the virtual area 60. For example, the guest(s) 54 may view an object 65 (e.g., a physical prop or a display) in the viewing area 58 as a transmitted element 66 that is transmitted or visible through the beam splitter 64. In other words, the guest(s) 54 may see through the beam splitter 64 and directly view the transmitted element 66 in the viewing area 58. Moreover, the guest(s) 54 may view an object 67 in the virtual area 60 as a reflected element 68 that is reflected off the beam splitter 64 toward the guest area 52. That is, the guest(s) 54 may see a reflection of the object 67 in the virtual area 60 via the beam splitter 64. To this end, lighting in the attraction system 50 (e.g., in the virtual area 60) may cause imagery of the object 67 in the virtual area 60 to be projected to the beam splitter 64 for reflection toward the guest area 52, and the beam splitter 64 may be oriented such that the reflection of the object 67 may provide a reflected element 68 that appears to be physically positioned in the viewing area 58, such as adjacent to the transmitted element 66. By way of example, the beam splitter 64 may be angled (e.g., at a 45 degree angle) with respect to a line of sight of the guest(s) 54 toward the viewing area 58 and/or with respect to the projection of the object 67 from the virtual area 60 toward the beam splitter 64. Further, the beam splitter 64 may be made from a material, such as glass, plastic, a foil, and/or a semi-transparent mirror, that includes both transmissive and reflective properties to enable viewing of the transmitted element 66 of the viewing area 58 through the beam splitter 64 and viewing of the reflected element 68 of the virtual area 60 as reflected off the beam splitter 64.

The reflected element 68 in FIG. 1 is depicted with dashed lines to indicate that the reflected element 68 merely appears to be present in the viewing area 58 while actually being a reflection of the object 67. The combined imagery of the transmitted element 66 and the reflected element 68 in the viewing area 58 may provide a unique viewing experience for the guest(s) 54. For instance, movement, adjustment, or any other alteration of the object 67 in the virtual area 60 may cause corresponding change in the reflected element 68 in the viewing area 58. As an example, the object 67 in the virtual area 60 may be adjusted to simulate an interaction between the transmitted element 66 and the reflected element 68 in the viewing area 58. Thus, the object 67 may be adjusted to portray a more realistic appearance of the reflected element 68. Furthermore, in an embodiment, the reflected element 68 viewable by the guest(s) 54 may also include certain properties, qualities, or characteristics. For example, the reflected element 68 have a transparent or translucent appearance. For example, the transmitted element 66 and/or another physical object in the viewing area 58 may appear to be visible through the reflected element 68. As such, the appearance of the reflected element 68 may be different than that of a direct view of the object 67.

In one embodiment, the object 67 in the virtual area 60 may include a digital element 70, which may be digitally rendered and projected into the virtual area 60, and imagery of the digital element 70 may reflect off the beam splitter 64 and be viewed by the guest(s) 54 as the reflected element 68. By way of example, the virtual area 60 may include a light field display in which a three-dimensional (3-D) image may be projected. For instance, the virtual area 60 may include a display array or surface (e.g., an array of lenses) that may manipulate how light converges, focuses, and/or is directed. For example, the display array may cause light to focus at different locations, such as different depths with respect to the guests. The manipulation of light properties may cause an image projected onto or via the display array to have an appearance of layers, contour, and/or texture, thereby forming 3-D profile for the projected image. Additionally or alternatively, the virtual area 60 may include a different display, such as a two-dimensional (2-D) display and/or a 3-D display that does not use a light field display. In such an embodiment, the digital element 70 may be projected based on a determined view of the guest(s) 54, such as based on an eye location of the guests 54 to present an accurate appearance of the reflected element 68 from the perspective of the guest(s) 54. Additionally or alternatively, multiple viewpoints of the digital element 70 may be presented, time multiplexed images (e.g., synchronized refreshing of images and alternating illumination of the images from different viewpoints) may be utilized, and so forth, to simultaneously provide different perspectives of the digital element 70 (e.g., to multiple guests 54 positioned at different locations in the guest area 52). In an embodiment, the virtual area 60 may include a projector or other device 72 configured to cause the digital element 70 to be displayed within the virtual area 60 for reflection of the beam splitter 64.

Moreover, the show effect system 56 may include a control system 74 (e.g., an automation controller, a programmable logic controller, an electronic controller) configured to operate to adjust the experience provided to the guest(s) 54 via the show effect system 56. The control system 74 may include a memory 76 and processing circuitry 78. The memory 76 may include volatile memory, such as random access memory (RAM), and/or non-volatile memory, such as read-only memory (ROM), optical drives, hard disc drives, solid-state drives, or any other non-transitory computer-readable medium that includes instructions. The processing circuitry 78 may be configured to execute such instructions. For example, the processing circuitry 78 may include one or more application specific integrated circuits (ASICs), one or more field programmable gate arrays (FPGAs), one or more general purpose processors, or any combination thereof.

In an embodiment, the control system 74 may operate to provide the digital element 70 in the virtual area 60. By way of example, the control system 74 may transmit image data to the projector 72 to cause the projector 72 to provide the digital element 70 based on the image data. For instance, the control system 74 may adjust and update the image data provided to the projector 72 to adjust the appearance of the digital element 70 and cause corresponding adjustment of the appearance of the reflected element 68 in the viewing area 58. As an example, the control system 74 may transmit image data to the projector 72 that portrays movement of the reflected element 68 in the viewing area 58, such as relative to the transmitted element 66. As another example, the control system 74 may adjust the appearance of digital element 70 based on the transmitted element 66. For instance, the transmitted element 66 may be at least partially transparent and may include various properties that may distort an appearance of a real world object viewed through the transmitted element 66. In one example, the transmitted element 66 may refract light directed through the transmitted element 66 and may adjust a continuity of the profile of the real world object viewed through the transmitted element 66. In another example, the transmitted element 66 may be partially opaque and may block or limit transmission of light through the transmitted element 66. Thus, the transmitted element 66 may mute the appearance of the real world object viewed through the transmitted element 66. In a further example, the transmitted element 66 may have a color property (e.g., a hue, a tint, a tone, a shade) that may change a color of the real world object viewed through the transmitted element 66. The control system 74 may transmit image data to the projector 72 that causes the projector 72 to provide a digital element 70 and corresponding imagery of a reflected element 68 that appears to be distorted by the transmitted element 66. Such distorted appearance of the reflected element 68 may portray physical positioning of the object 67 corresponding to the reflected element 68 in the viewing area 58. In this manner, the control system 74 may provide a more realistic appearance of the reflected element 68. For example, the transmitted element 65 may be a substantially transparent crystal, and a portion of the object 67 that the guest(s) 54 would perceive as being viewed through the transparent crystal may be distorted to provide realism.

The viewing area 58 may include a sensor 82 disposed within the viewing area 58 and configured to transmit sensor data to the control system 74. The sensor data may include a parameter indicative of a manner in which the control system 74 is to render the digital element 70 to cause a realistic appearance of the reflected element 68. For example, the sensor data may include a parameter associated with a manner in which the transmitted element 66 may distort an appearance of an object viewed through the transmitted element 66, and the control system 74 may cause rendering of the digital element 70 in the virtual area 60 to portray such distortion (e.g., a tinted, twisted, or bent version of an original image). Thus, the control system 74 may provide a realistic appearance of the reflected element 68 based on the sensor data received from the sensor 82.

The virtual area 60 may additionally or alternatively include a real world or physical object 80 positioned within the virtual area 60. Indeed, the object 67 may represent any number of real world or electronically produced (e.g., projected or displayed) objects. Imagery of the real world object 80 may be projected onto the beam splitter 64 and viewed as the reflected element 68 by the guest(s) 54. In one embodiment, the control system 74 may adjust an appearance of the digital element 70 based on the real world object 80. By way of example, the control system 74 may adjust the appearance of the digital element 70 to simulate an interaction between the digital element 70 and the real world object 80 (e.g., as the reflected element 68), as well as an interaction between the digital element 70 and the transmitted element 66. Thus, the control system 74 may provide a more realistic appearance of the reflected element 68 that may be based on include both the digital element 70 and the real world object 80 in the virtual area 60.

In an embodiment, the real world object 80 may also distort an appearance of an object viewed through the real world object 80. For example, the real world object 80 may have similar characteristics and properties as that of the transmitted element 66, and the real world object 80 may be positioned to cause a distortion in the appearance of the digital element 70 viewed through the real world object 80. Thus, the real world object 80 (e.g., a crystal or glass structure, such as a crystal ball) may distort the imagery of the digital element 70 projected onto the beam splitter 64, thereby distorting the reflected element 68 corresponding to the imagery of the digital element 70. Such distortion of the reflected element 68 via the real world object 80 may therefore appear to be caused by the transmitted element 66 to portray the digital element 70 as being physically positioned within the viewing area 58. In this manner, the real world object 80 positioned in the virtual area 60 may facilitate distorting the appearance of the reflected element 68 (e.g., with limited distortion in the rendering of the digital element 70 provided by the control system 74).

The control system 74 may be configured to adjust a positioning of the real world object 80 (e.g., a magnifying glass) in the virtual area 60. By way of example, the real world object 80 may be coupled to an actuator 84 (e.g., one or more actuators) configured to drive movement of the real world object 80. The control system 74 may be communicatively coupled to the actuator 84 and may instruct the actuator 84 to move the real world object 80, such as to position the real world object 80 relative to the digital element 70 to distort the appearance of the digital element 70.

Figure 2:
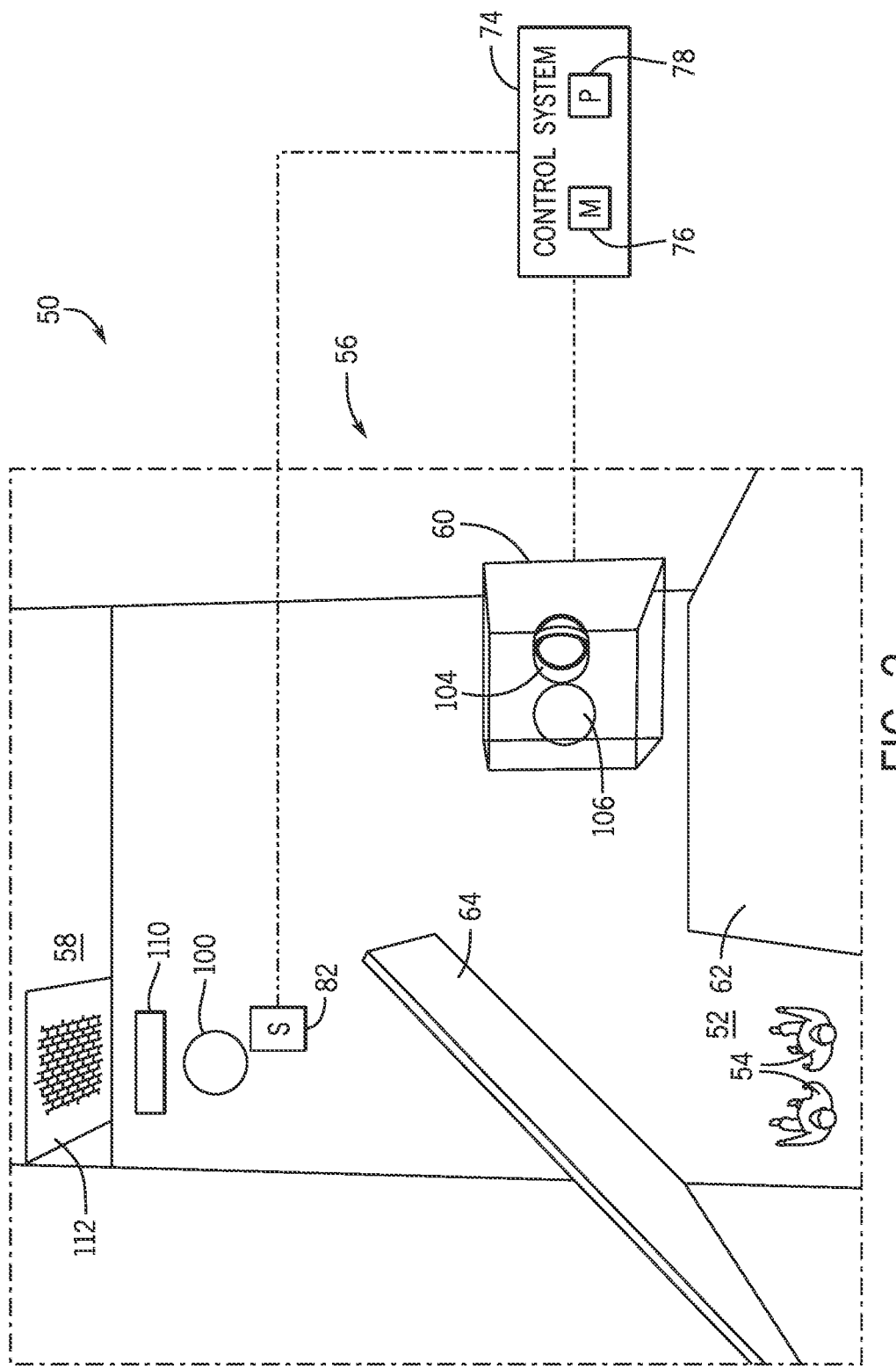
FIG. 2 is a plan view of an embodiment of an attraction system, in accordance with an aspect of the present disclosure.

FIG. 2 is a plan view of an embodiment of the attraction system 50. In the illustrated attraction system 50, the viewing area 58 includes a physical object 100 (e.g., the object 65 described with respect to FIG. 1). In FIG. 2, the physical object 100 is a ball made of a transparent material (e.g., glass). The physical object 100 may be visible to the guests 54 through the beam splitter 64. In this manner, the guests 54 may view the physical object 100 as a transmitted element via the beam splitter 64. The virtual area 60 of the illustrated attraction system 50 includes a rendering of a first digital element 104 and a second digital element 106 (e.g., the object 67 described with respect to FIG. 1). While the first digital element 104 and the second digital element 106 are depicted as 3-D objects for purposes of illustration in FIG. 2, the digital elements 104, 106 may represent 2-D objects on a display (e.g., a television or projection screen) or light field display objects. Furthermore, while the first digital element 104 and the second digital element 106 are depicted as separate digital elements in FIG. 2, the digital elements 104, 106 may be generated via a single digital element (e.g., a combination of 2-D images, a collection of generated and projected pixels on a display). Imagery of the first digital element 104 and/or the second digital element 106 may be visible to the guests 54 as reflected elements. That is, imagery of the first digital element 104 and the second digital element 106 may be projected onto beam splitter 64 and reflected toward the guests 54, and the guests 54 may see such reflected imagery as portraying the first digital element 104 and the second digital element 106 being physically positioned in the viewing area 58. In an embodiment, a projector (e.g., the projector 72 of FIG. 1) may provide the first digital element 104 and/or the second digital element 106 in the virtual area 60 for reflection off the beam splitter 64. For example, the first digital element 104 and/or the second digital element 106 may be projected as 3-D images (e.g., via a light field display of the virtual area 60).

By aligning reflections with the physical object 100, in one embodiment, the first digital element 104 and the second digital element 106 may be projected within the virtual area 60 in a manner that provides an appearance of occlusion of the imagery of the first digital element 104 in the viewing area 58 via the physical object 100. In other words, from the perspective of the guests 54, the first digital element 104 appears to be physically positioned behind the physical object 100 in the viewing area 58 based in part on the appearance of distortion of the first digital element 104 by the second digital element 106. Indeed, without the projection of the second digital element 106 and a distorted first digital element 104, the guests 54 may see the reflected imagery of the first digital element 104 as merely overlaid onto the physical object 100, because light passing through the first digital element 104 in the virtual area 60 would not pass through the physical object 100 in the viewing area 58 and be distorted by the physical object 100. For example, without the generated distortion and the second digital element 106, the first digital element 104 would appear to be physically positioned in front of the physical object 100 in the viewing area 58, and the physical object 100 may be at least partially visible through the reflected imagery of the first digital element 104. The reflected imagery of the second digital element 106 may be provided to block perceived visibility of the physical object 100 through the reflected imagery of the first digital element 104. As previously noted, in one embodiment, the second digital element 106 could be replaced with an actual physical object that distorts the presentation of the first digital element 104 after the associated light passes through the actual physical device in the virtual area 60. As such, the first digital element 104 and/or the second digital element 106 may be rendered to provide an appearance that the first digital element 104 is physically behind the physical object 100 in the viewing area 58 and is visible through the physical object 100 or an actual physical object may provide a similar effect.

The second digital element 106 may correspond to the physical object 100 and may have a similar appearance, profile, size, shape, and/or geometry as the physical object 100. Additionally, the second digital element 106 may be projected in the virtual area 60 (e.g., at a particular position) such that the reflected imagery of the second digital element 106 in the viewing area 58 may align, match, or overlay with the physical object 100 in the viewing area 58. In this manner, the physical object 100 and the imagery of the second digital element 106 may appear as a single element (e.g., the same physical object) in the viewing area 58 to the guests 54.

Furthermore, the first digital element 104 may be projected in the virtual area 60 with respect to the second digital element 106 (e.g., at another position relative to the position of the second digital element 106) such that the second digital element 106 appears to block visibility of a portion of the first digital element 104 from the guest area 52. In other words, to the guests 54, the second digital element 106 appears to occlude a portion of the first digital element 104. In this manner, the first digital element 104 appears to be positioned behind the second digital element 106 in the viewing area 58. Moreover, since the reflected imagery of the second digital element 106 and the physical object 100 appear to be a single element or object positioned in the viewing area 58, the first digital element 104 may also appear to be positioned behind the physical object 100 in the viewing area 58.

In an embodiment, the physical object 100 may be at least partially transparent to enable the guests 54 to see through the physical object 100. For this reason, the second digital element 106 may also be rendered to simulate the transparent properties of the physical object 100. By way of example, the second digital element 106 may be rendered such that the reflected imagery of the second digital element 106 appears to be partially transparent, and the first digital element 104 may be rendered such that a portion of the reflected imagery of the first digital element 104 appears to be visible through the reflected imagery of the second digital element 106. In this manner, the first digital element 104 and the second digital element 106 may be rendered to provide an appearance that the first digital element 104 is visible through the physical object 100.

Moreover, the physical object 100 may include certain properties that may distort or adjust transmission of light through the physical object 100. By way of example, the physical object 100 (e.g., a water tank, a glass sphere) may include refractive properties that may re-direct or bend the transmission of light and/or may include color properties that may change the visible light spectrum viewable by the guests 54. As such, the physical object 100 may distort an appearance of an additional physical object 110 that may be viewed through the physical object 100. For instance, the additional physical object 110 may be positioned on a side of the physical object 100 opposite (e.g., behind) the side where the guests 54 are positioned with respect to the physical object 100, and the additional physical object 110 may be visible to the guests 54 through the physical object 100. That is, the physical object 100 may include distortive properties that distort the appearance of the additional physical object 110 observed by the guests 54 and seen through the physical object 100. In other words, a first appearance of the additional physical object 110 as viewed through the physical object 100 may be different than a second appearance of the additional physical object 110 as directly viewed without the physical object 100.

However, since the imagery of the first digital element 104 and the second digital element 106 reflects toward the guest area 52 (e.g., rather than through the physical object 100), the guests 54 do not view the imagery through the physical object 100. Thus, the distortive properties of the physical object 100 may not directly distort or alter the reflected imagery of the first digital element 104 and/or the second digital element 106. Instead, the appearance of the reflected imagery of the first digital element 104 and/or of the second digital element 106 may be substantially the same as the rendering of the first digital element 104 and/or of the second digital element 106 in the virtual area 60. For this reason, the first digital element 104 may be rendered to portray the distortive properties of the physical object 100 affecting the appearance of the first digital element 104. That is, distorted effects may be applied to the first digital element 104 to portray that the first digital element 104 is positioned in the viewing area 58 behind the physical object 100, and that the appearance of the first digital element 104 seen through the physical object 100 is being distorted by the distortive properties of the physical object 100. As an example, the appearance of the portions of the first digital element 104 overlapping with (e.g., occluded by) the second digital element 106 (e.g., representing the physical object 100) may be distorted to simulate corresponding distortion caused by the physical object 100. In other words, the second digital element 106, and therefore the physical object 100, appears to be distorting the first digital element 104 from the view of the guests 54. In this manner, the first digital element 104 may more realistically appear to be physically positioned in the viewing area to provide a realistic and/or immersive visual effect.

The control system 74 may be configured to adjust the rendering of the first digital element 104 and/or of the second digital element 106 to simulate a realistic physical appearance of the first digital element 104 in the viewing area 58. In one embodiment, the control system 74 may determine a distortive parameter associated with the physical object 100 and indicative of a distortion caused by the physical object 100 with respect to an appearance of a real world object seen through the physical object 100. As an example, the distortive parameter may include a refractive index, a transparency measurement, a diffractive property, and/or a color blend that may indicate an amount or manner in which the physical object 100 may distort another object. Indeed, the distortive parameter may be based on a material of the physical object 100. The control system 74 may be configured to adjust the rendering of the first digital element 104 to apply distorted effects based on the distortive parameter. For instance, the distorted effects may include a discontinuous profile, an offset, a misalignment, a bend, and/or a curve between portions of the first digital element 104, a change in color of the first digital element 104, a mirror of certain parts of the first digital element 104, and the like. Additionally or alternatively, the control system 74 may be configured to adjust the rendering of the first digital element 104 based on another parameter associated with the physical object 100, such as a profile of the physical object 100 (e.g., a geometry and/or size of the physical object 100), a position of the physical object 100 (e.g., within the viewing area 58), or any other suitable parameter that may indicate a location in the viewing area 58 in which the first digital element 104 may be distorted. Adjusting the rendering of the first digital element 104 based on the determined parameter(s) may portray the first digital element 104 as being physically positioned within the viewing area 58 instead of as a reflection off the beam splitter 64.

The control system 74 may also generate the second digital element 106 to match the appearance of the reflected imagery of the second digital element 106 with that of the physical object 100 and to portray that the first digital element 104 appears to be positioned behind the second digital element 106 and therefore behind the physical object 100. To this end, the control system 74 may adjust the rendering (e.g., by transmitting image data to a projector configured to project an image of the second digital element 106) of the second digital element 106 based on the distortive parameter of the physical object 100. For instance, based on the distortive parameter of the physical object 100, the control system 74 may determine a manner in which light is transmitted through and/or is reflected by the physical object 100 to affect the appearance of the physical object 100, and the control system 74 may cause the rendering of the second digital element 106 to adjust the corresponding appearance of the reflected imagery of the second digital element 106 based on the appearance of the physical object 100. Furthermore, the control system 74 may determine a position and/or orientation in which the second digital element 106 may appear to be disposed within the virtual area 60 to match that of the physical object 100 within the viewing area 58. In this manner, the reflected imagery of the second digital element 106 may match that of the real appearance of the physical object 100 as viewed by the guests 54. Stated differently, the guests 54 may not perceive the second digital element 106 as being a separate object from the physical object 100.

The control system 74 may then adjust the rendering of the first digital element 104 and/or of the second digital element 106 to portray that the reflected imagery of the first digital element 104 appears to be positioned behind the reflected imagery of the second digital element 106 and therefore behind the physical object 100 in the viewing area 58. Furthermore, the control system 74 may adjust the rendering of the first digital element 104 and/or of the second digital element 106 to portray that the reflected imagery of the first digital element 104 appears to be visible through the reflected imagery of the second digital element 106 and therefore through the physical object 100. As a result, the guests 54 may perceive that the first digital element 104 is positioned behind the physical object 100 in the viewing area 58, that the first digital element 104 is visible through the physical object 100, and that the appearance of the first digital element 104 is distorted by the physical object 100.

In an embodiment, the distortive parameter of the physical object 100 may be provided to the control system 74 via a user input. For example, a user (e.g., an operator, a technician) may provide the distortive parameter prior to operation of the attraction system 50, and the control system 74 may operate the attraction system 50 to render the first digital element 104 and/or the second digital element 106 based on the distortive parameter previously provided by the user. Indeed, the control system 74 may be pre-programmed to provide a particular rendering of the first digital element 104 and/or the second digital element 106 during a cycle of operation of the attraction system 50.

Additionally or alternatively, the control system 74 may be configured to determine the distortive parameter automatically (e.g., without a user input) and cause rendering of the first digital element 104 and/or the second digital element 106 based on the determined distortive parameter, which may be determined and transmitted by the sensor 82. For instance, the sensor 82 may include a refractometer configured to determine a refractive index associated with the physical object 100, a transparency meter (e.g., a clarity meter) configured to determine a transparency associated with the physical object 100, a position sensor configured to determine a position and/or movement of the physical object 100 (e.g., within the viewing area) 58, a visual or optical sensor configured to determine an appearance of the physical object 100 (e.g., from the guest area 52), another suitable sensor, or any combination thereof. Based on the sensor data received from the sensor 82, the control system 74 may be configured to adjust, modify, or otherwise update the rendering of the first digital element 104 and/or of the second digital element 106. Additionally or alternatively, the control system 74 may determine the distortive parameter via a physics-based model, analysis, and/or simulation (e.g., a software program). For example, the physics-based model may include a light refraction algorithm that may define a refractive index for use by the control system 74. Thus, the control system 74 may be configured to adjust, modify, or otherwise update the rendering of the first digital element 104 and/or of the second digital element 106 based on the physics-based model.

In an example embodiment, the distortive parameter may initially be provided to the control system 74 via user input, and the control system 74 may cause the first digital element 104 and/or the second digital element 106 to be rendered in accordance with the user input. Moreover, during operation of the attraction system 50, the distortive parameter of the physical object 100 may change from that provided by the user, and the control system 74 may adjust the rendering of the first digital element 104 and/or of the second digital element 106 based on a determined updated distortive parameter that may be different than the initial distortive parameter provided via the user input. For example, the physical object 100 may include water, and movement of the water may change to adjust the distortive parameter associated with the physical object 100. In response to the change in the distortive parameter (e.g., as determined by the sensor 82), the control system 74 may change the image data used to present the first digital element 104 and/or the second digital element 106. Accordingly, the control system 74 may change the rendering of the first digital element 104 and/or of the second digital element 106 based on a change in the physical object 100 in the viewing area 58 to maintain a realistic appearance provided by the show effect system 56.

Although the illustrated attraction system 50 includes a physical object 100 in the viewing area 58, in an additional or alternative embodiment, a different object, such as a digital element (e.g., an image), may be disposed in the viewing area 58. By way of example, the control system 74 may control rendering of the digital element in the viewing area 58 and corresponding rendering of the first digital element 104 and/or the second digital element 106 in the virtual area 60. For instance, the control system 74 may display a background 112 of the viewing area 58. The background 112 may be visible through and distorted by the physical object 100, because light passing through the physical object 100 and onto the background 112 is distorted. As a result, the first digital element 104 and/or the second digital element 106 may be rendered based on the background 112, such as to incorporate the distortion of the background 112 to portray a more realistic appearance of the background 112 seen through the physical object 100. Thus, in response to adjustment of the display of the background 112, the control system 74 may also adjust the rendering of the first digital element 104 and/or the second digital element 106.

Furthermore, in an embodiment, a physical object (e.g., the real world object 80 described with respect to FIG. 1) in addition to or as an alternative to the second digital element 106 may be disposed in the virtual area 60. The physical object may have a distortive parameter corresponding to the distortive parameter of the physical object 100 to distort the imagery of the first digital element 104 reflected off the beam splitter 64. Such distortion of the imagery of the first digital element 104 caused by the physical object in the virtual area 60 may correspond to distortions caused by the distortive parameter associated with the physical object 100 in the viewing area 58. Furthermore, a physical appearance of the physical object of the virtual area 60 may match that of the physical object 100 of the viewing area 58. As an example, a profile, a geometry, a size, a shape, and so forth, of the physical object of the virtual area 60 may correspond to that of the physical object 100 of the viewing area 58. As another example, the physical object may be positioned in the virtual area 60 (e.g., via the actuator 84 of FIG. 1) such that the position of the reflected imagery of the physical object aligns with the position of the physical object 100 in the viewing area 58 from the perspective of the guests 54. In this way, the reflected imagery of the physical object of the virtual area 60 and the physical object 100 of the viewing area 58 may appear as the same object to the guests 54. Positioning the physical object in the virtual area 60 to appear as the physical object 100 in the viewing area 58 and to cause distortions on the imagery of the first digital element 104 may portray the distortions of the imagery of the first digital element 104 as being caused by the physical object 100 in the viewing area 58. Thus, the first digital element 104 may appear to be physically positioned in the viewing area 58. In such an embodiment, the distorted effects of the reflected imagery of the first digital element 104 may be sufficiently applied via the physical object in the viewing area, and the distorted effects provided via the control system 74 by generating the image data may therefore be limited. As such, operation of the control system 74 may be reduced and/or less complex.

Figure 3:
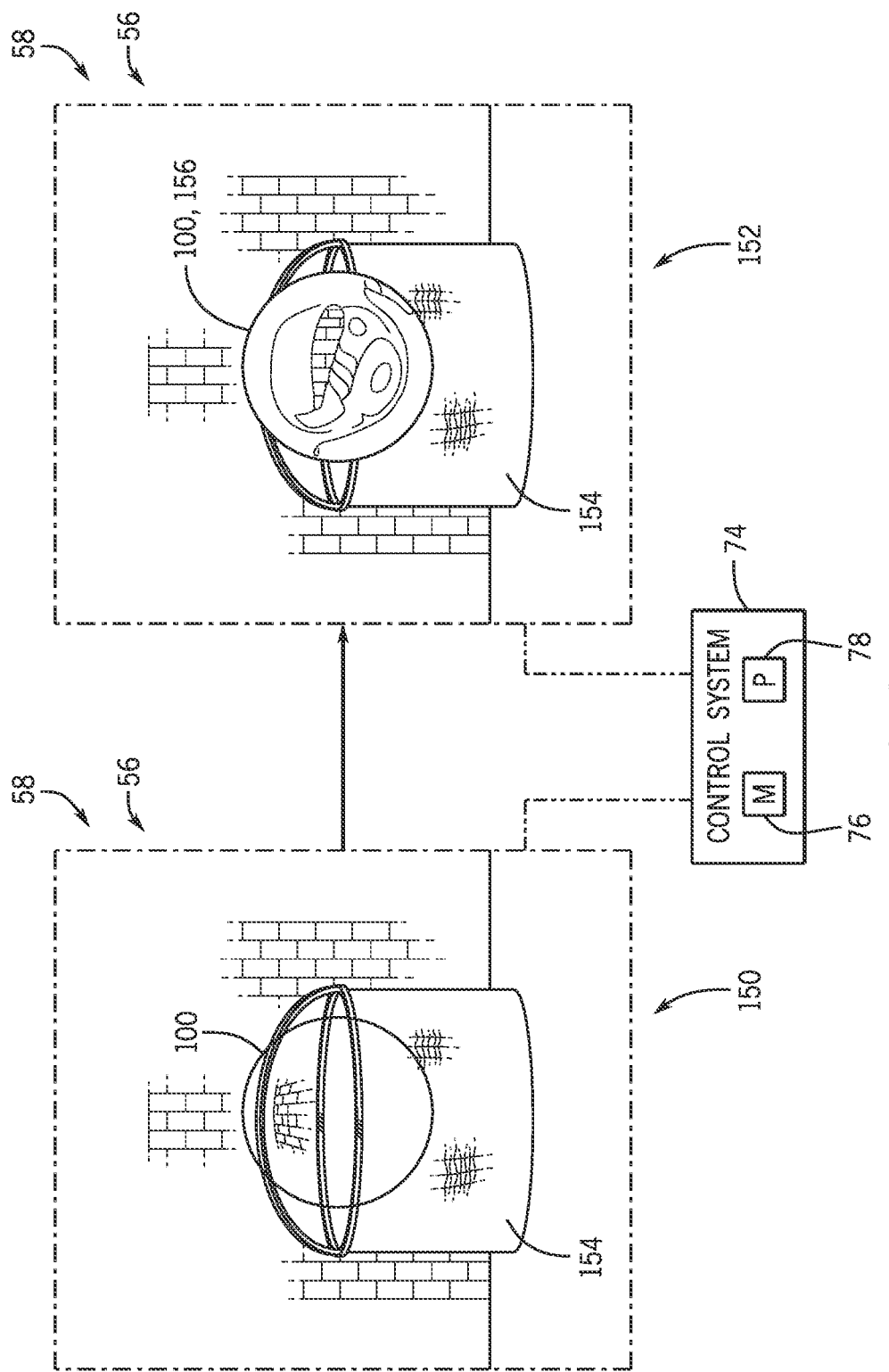
FIG. 3 is a front view of an embodiment of a show effect transition provided by a show effect system of an attraction system, in accordance with an aspect of the present disclosure.

FIG. 3 is a front view of the viewing area 58 of an attraction system, illustrating show effects provided via the show effect system 56. In particular, FIG. 3 illustrates a first show effect 150 and a second show effect 152 provided by the show effect system 56, and each of the first show effect 150 and the second show effect 152 includes the viewing area 58 as viewed by a guest from a guest area of the attraction system. In an embodiment, the control system 74 may be configured to effectuate the first show effect 150 and the second show effect 152, such as by generating and transmitting image data to enable visibility of reflected imagery of a digital element from the guest area.

The first show effect 150 may include the physical object 100 that is physically positioned in the viewing area 58 and first reflected imagery 154 that is reflected off a beam splitter. For instance, the physical object 100 may be seen through the beam splitter, and the first reflected imagery 154 may be visible via a first digital element (e.g., the first digital element 104 described with respect to FIG. 2) presented in a virtual area and reflected off the beam splitter. The beam splitter may not be visible from the guest area to increase realism of the appearance of the physical object 100 and the first reflected imagery 154, such as by portraying the appearance that the first reflected imagery 154 is an object physically positioned within the viewing area 58. As an example, various lighting effects, which may be caused by the show effect system 56, may conceal the beam splitter from view.

The control system 74 may cause the first digital element to be displayed in the virtual area in order to generate the first reflected imagery 154 that appears to be in the viewing area 58. In the illustrated first show effect 150, the first reflected imagery 154 and the physical object 100 are overlaid with respect to one another. For example, the position of the first digital element in the viewing area may cause the first reflected imagery 154 to overlap with the physical object 100. Additionally, the first reflected imagery 154 may be at least partially transparent in the first show effect 150, and the physical object 100 may therefore be visible through the first reflected imagery 154. Furthermore, the appearance of the first reflected imagery 154 may not be distorted by the physical object 100, which may be associated with a distortive parameter. In other words, although the physical object 100 may be associated with the distortive parameter and the first reflected imagery 154, and although the physical object 100 appears to overlap with the first reflected imagery in the viewing area 58, the physical object 100 does not distort the first reflected imagery 154, because light passing through the first reflected imagery 154 in the virtual area 60 does not pass through the physical object 100 in the viewing area 58. In this manner, the first show effect 150 may not include distorted effects applied to the first reflected imagery 154 and visible to guests.

The second show effect 152 may include distorted effects applied to the first reflected imagery 154 to portray distortion caused by the physical object 100. For example, the second show effect 152 may include a second reflected imagery 156 that corresponds to the physical object 100. The second reflected imagery 156 may be visible via a second digital element (e.g., the second digital element 106 described with respect to FIG. 2) presented in the virtual area by the control system 74 and reflected off the beam splitter to appear to be positioned in the viewing area 58. The second reflected imagery 156 and the physical object 100 may appear to be a single object physically positioned in the viewing area 58 in the second show effect 152. To this end, the control system 74 may cause the second digital element to be generated in the virtual area and reflected by the beam splitter to appear as though present in the viewing area 58 such that the second reflected imagery 156 and physical object 100 may generally have the same appearance (e.g., the same shape, the same size, the same texture), as well as to align or overlay the second reflected imagery 156 and physical object 100 with one another.

Furthermore, the control system 74 may cause a third digital element to be presented in the viewing area 58, such as by adjusting an appearance of the first digital element corresponding to the first reflected imagery 154 in the first show effect 150, to generate a third reflected imagery 158. The third reflected imagery 158 may appear to be physically positioned behind, visible through, and distorted by the physical object 100 and the second reflected imagery 156 in the second show effect 152. In this manner, the second show effect 152 may portray the third reflected imagery 158 as another physical object positioned within the viewing area 58 instead of as a reflection off the beam splitter to provide a realistic interaction between the physical object 100 and the third reflected imagery 158. For example, the control system 74 may cause the third digital element to be presented at a position relative to the second digital element in a virtual area to cause the third reflected imagery 158 corresponding to the third digital element to appear to be behind the second reflected imagery 156 corresponding to the second digital element and therefore also behind the physical object 100 in the viewing area 58. Moreover, the control system 74 may cause the third digital element to be presented in the virtual area such that the third reflected imagery 158 appears to be distorted by the second reflected imagery 156 and therefore by the physical object 100. In other words, as compared to the first reflected imagery 154 in the first show effect 150, the third reflected imagery 158 may appear to be distorted. For example, the third digital element presented in the virtual area may include an irregular geometry, a discontinuous profile, misaligned portions, mirrored parts, and so forth to portray a distortion in the corresponding third reflected imagery 158. In this manner, the second show effect 152 may portray a realistic appearance of reflected imagery to simulate distortion caused by the physical object 100.

In addition to causing the third reflected imagery 158 to appear to be distorted by the physical object 100, the second show effect 152 may enable the physical object 100 to cause distortions of an additional physical object in the viewing area 58. For example, the additional physical object may be positioned behind the physical object 100 (e.g., and appear to be behind the second reflected imagery 156 and the third reflected imagery 158), and the physical object 100 may distort the appearance of the additional physical object. Indeed, regardless of the reflected imagery generated via the control system 74, the physical object 100 may continue to physically distort objects positioned in the viewing area 58. In this manner, the physical object 100 may appear to distort both reflected imagery and physical objects, further enhancing the realism that the reflected imagery corresponds to real world objects physically positioned in the viewing area 58.

Each of FIGS. 4 and 5 described below illustrates a method or process for operating a show effect system for an attraction system. Any suitable device (e.g., the processing circuitry 78 of the control system 74 illustrated in FIGS. 1-3) may perform the respective methods. In one embodiment, each method may be implemented by executing instructions stored in a tangible, non-transitory, computer-readable medium (e.g., the memory 76 of the control system 74 illustrated in FIGS. 1-3). For example, each method may be performed at least in part by one or more software components, one or more software applications, and the like. While each method is described using steps in a specific sequence, additional steps may be performed, the described steps may be performed in different sequences than the sequence illustrated, and/or certain described steps may be skipped or not performed altogether.

Figure 4:
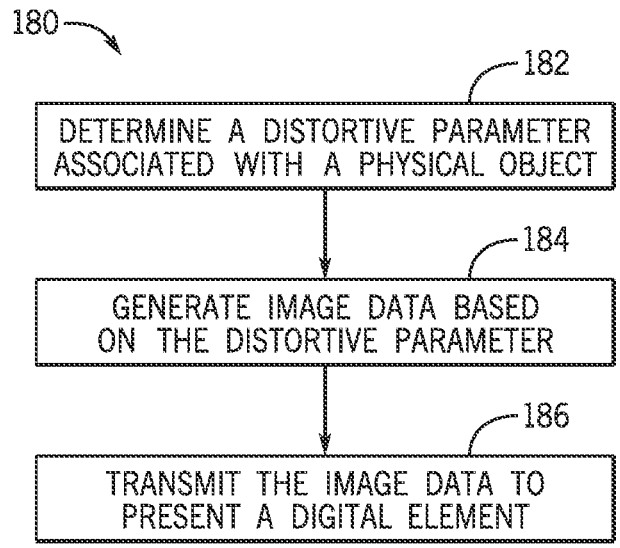
FIG. 4 is a flowchart of a method or process for providing a show effect via a show effect system of an attraction system, in accordance with an aspect of the present disclosure.

FIG. 4 is a flowchart of an embodiment of a method or process 180 for operating a show effect system of an attraction system to provide a realistic Pepper's Ghost-style show effect. At block 182, a distortive parameter associated with a physical object positioned in a viewing area may be determined. The physical object may be directly visible to a guest of the attraction system through a beam splitter. The distortive parameter may include any suitable parameter that may distort or change an appearance of another object (e.g., another physical object positioned behind the physical object in the viewing area) seen through the physical object, such as a refractive index, a transparency measurement, a color blend, a profile, a size, a shape, a position, and so forth. In an embodiment, the distortive parameter may be determined via sensor data, which may be transmitted from a sensor of the attraction system. In an additional or alternative embodiment, the distortive parameter may be determined using a physic s-based model. In a further embodiment, the distortive parameter may be provided via user input.

At block 184, image data may be generated based on the distortive parameter. The image data may be used to present a first digital element in a virtual area of the attraction system, and first reflected imagery of the first digital element may be visible to the guest via reflection off the beam splitter. The image data may be generated to apply distorted effects to the first reflected imagery and portray that the first reflected imagery is distorted by the physical object, thereby simulating an appearance that the first reflected imagery is a real world object positioned within the viewing area. As an example, the image data may be generated based on the distortive parameter such that certain portions of the first reflected imagery appear to be distorted by the physical object. The appearance of the distortions of the first reflected imagery, such as the geometry, irregularity, continuity, orientation, and so forth of the distortions appear to be caused by the physical object. By way of example, an appearance property, such as an angle of refraction, a visibility, a color, and the like, associated with the first reflected imagery, may be determined based on the distortive parameter of the physical object, and the distorted effects may be applied based on the appearance property.

As another example, the image data may be generated based on another parameter associated with the physical object. For instance, an overlap between respective positions of the first reflected imagery and the physical object, from the perspective of the guest, may be determined based on the position of the physical object in the viewing area, the profile of the physical object, the size of the physical object, and so forth, as well as the position of the first digital element in the virtual area, a corresponding position of the first reflected imagery, and the like. The distorted effects may be applied to specific parts of the first digital element corresponding to the overlap to portray those corresponding parts of the first reflected imagery are distorted by the physical object.

The image data being generated may further include a second digital element corresponding to the physical object. For example, the second digital element may be generated to occlude a portion of the first reflected imagery corresponding to the first digital element to portray that the physical object in the viewing area is occluding the portion of the first reflected imagery. As such, the second digital element may be generated such that a second reflected imagery corresponding to the second digital element is overlaid on the physical object when viewed by the guest. Thus, the position, profile, geometry, and/or size of the second digital element in the virtual area may correspond to the position, profile, geometry, and/or size of the physical object in the viewing area. By way of example, a first position of the physical object (e.g., as seen by the guest) in the viewing area may be determined and may be set as a target position of the second reflected imagery corresponding to the second digital element. In this manner, the second digital element may be presented in a second position in the virtual area that causes the second reflected imagery to appear at the target position, thereby causing the respective positions of the physical object and the second reflected imagery to align with one another and appear as a single object to the guest.

At block 186, the image data may be transmitted to cause the digital elements to be presented in the virtual area. As an example, the image data may be transmitted to a projector, and the projector may present the digital elements based on the image data. In an embodiment, the virtual area may include a light field display, and the projector may present the digital elements as 3-D images via the light field display. In this manner, the reflected imagery of the digital elements may also appear to be 3-D and may have a more realistic appearance than reflected imagery of a 2-D image, for example.

Figure 5:
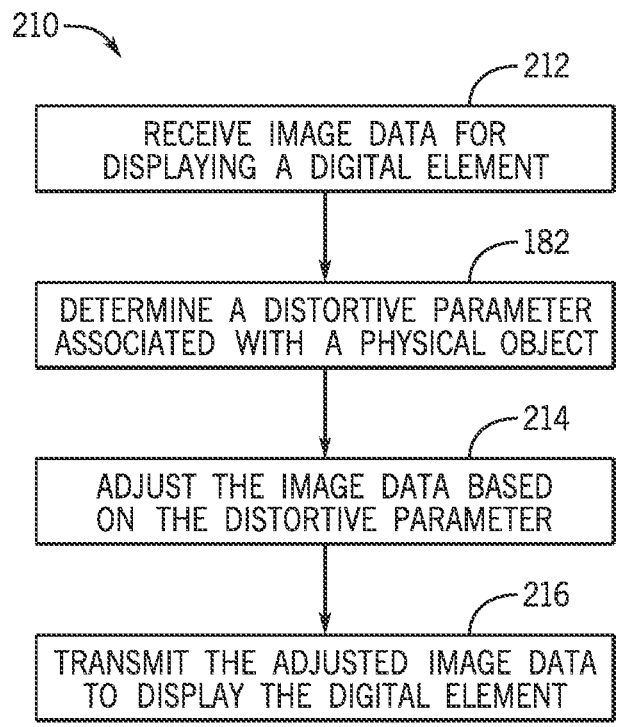
FIG. 5 is a flowchart of a method or process for providing a show effect via a show effect system of an attraction system, in accordance with an aspect of the present disclosure.

FIG. 5 is a flowchart of an embodiment of a method or process 210 for operating a show effect system of an attraction system. At block 212, image data may be received for presenting a digital element in a virtual area of the show effect system and causing corresponding display of reflected imagery of the digital element via a viewing area of the show effect system. The received image data may include an initial image data that would not apply a distorted effect to a corresponding digital element. For instance, the image data may correspond to reflected imagery that would be presented if undistorted by a physical object in the viewing area.

However, there may be a physical object in the viewing area, and the physical object may include distortive properties that would distort the appearance of other real world objects in the viewing area seen through the physical object. Therefore, it may be desirable to adjust the received image data to apply distorted effects to the digital element and the corresponding reflected imagery of the digital element in order to portray the digital element as a real world object positioned in the viewing area. As such, at block 182, a distortive parameter associated with the physical object in the viewing area may be determined, such as using the techniques described herein (e.g., via sensor data).

At block 214, the previously received image data may be adjusted based on the distortive parameter to apply distorted effects to a corresponding digital element. For example, in accordance with the techniques described with respect to block 184 of FIG. 4, the image data may be adjusted such that certain portions of a first digital element and reflected imagery of the first digital element appear to be distorted by the physical object. That is, the image data may be adjusted to add distorted effects to the corresponding first digital element and reflected imagery to portray distortions that appear to be caused by the physical object. In this manner, the received image data may be adjusted to portray an updated appearance of the digital element, such as in response to placement of the physical object in the viewing area. Indeed, adjustment of the image data may provide a realistic portrayal that the physical object distorts the appearance of the reflected imagery of the first digital element corresponding to the image data.

Furthermore, the image data may be adjusted to include or update presentation of a second digital element that corresponds to the physical object in order to occlude a portion of the reflected imagery of the first digital element. That is, adjusted image data may cause presentation of the second digital element in the virtual space, and the reflected imagery of the second digital element may appear to occlude the reflected imagery of the first digital element. The image data may also be adjusted to match the appearance of the reflected imagery of the second digital element with the appearance of the physical object, thereby portraying the reflected imagery of the second digital element and the physical object as the same object to the guest. In this way, the physical object may appear to occlude the reflected imagery of the first digital element.

After adjusting the image data, at block 216, the adjusted image data may be transmitted to display updated digital elements in a virtual area. For example, the adjusted image data may be transmitted (e.g., to a projector) to update a previously presented undistorted digital element according to the distortive parameter associated with the physical object. Thus, the corresponding reflected imagery of the digital element may also be updated to portray a distortion caused by the physical object, thereby providing a more realistic show effect to the guest.

It should be noted that certain steps of either of the methods 180, 210 may be repeated or iteratively performed during operation of the show effect system. For example, image data may be repeatedly generated and/or adjusted based on a determined distortive parameter (e.g., a change in the distortive parameter, such as a change in the refractive index) to present a digital element and corresponding reflected imagery of the digital element that appear to be deflected by the physical object. Thus, the show effect system may maintain a realistic appearance that the digital element is physically positioned in the viewing area.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system of an amusement park, the attraction system comprising:
a viewing area;
a virtual area;
a beam splitter positioned to enable visibility of a portion of the viewing area through the beam splitter and visibility of a portion of the virtual area via reflection off the beam splitter; and
a controller configured to perform operations comprising:
generating image data that is distorted in correlation to a distortive parameter associated with a first element disposed in the viewing area, wherein the distortive parameter is indicative of a distortion applied by the first element to light interacting with the first element; and
transmitting the image data to cause display of a second element in the virtual area.

2. The attraction system of claim 1, wherein the distortive parameter is indicative of the distortion applied by the light being transmitted through and/or reflected by the first element.

3. The attraction system of claim 1, wherein the second element comprises an image of an object distorted based on the distortive parameter.

4. The attraction system of claim 1, wherein the second element is visible as reflected imagery via reflection off the beam splitter, and the controller is configured to position the image data as overlapping with the first element from a viewing perspective of an observation area.

5. The attraction system of claim 4, wherein the reflected imagery is first reflected imagery, and the controller is configured to generate the image data to cause display of a third element in the virtual area and a corresponding display of second reflected imagery that reflects off the beam splitter and occludes the first reflected imagery.

6. The attraction system of claim 1, wherein the virtual area comprises a physical object disposed therein, the physical object comprises an additional distortive parameter corresponding to the distortive parameter associated with the first element, and the physical object is positioned to distort an image passing therethrough based on the additional distortive parameter to generate the image data.

7. The attraction system of claim 6, comprising an actuator configured to drive movement of the physical object, wherein the controller is configured to perform operations comprising:
  determining a first position of the first element; and
  instructing the actuator to move the physical object to align a second position of imagery of the physical object reflected off the beam splitter with the first position of the first element.

8. The attraction system of claim 1, comprising a sensor configured to monitor the distortive parameter associated with the first element, wherein the sensor is communicatively coupled to the controller and is configured to transmit sensor data indicative of the distortive parameter to the controller, and the controller is configured to generate the image data based on the sensor data.

9. The attraction system of claim 1, comprising a barrier blocking the virtual area from viewing from an observation area, wherein the beam splitter comprises a partially reflective film positioned between the viewing area and the observation area.

10. A non-transitory computer-readable medium, comprising instructions that, when executed by processing circuitry, are configured to cause the processing circuitry to perform operations comprising:
  determining a distortive parameter associated with a physical object disposed within a viewing area of a Pepper's Ghost system, wherein the physical object is visible through a beam splitter of the Pepper's Ghost system, and the distortive parameter is indicative of a distortion applied to light interacting with the physical object;
  generating image data based on the distortive parameter; and
  transmitting the image data to display a digital element in a virtual area of the Pepper's Ghost system, wherein reflected imagery of the digital element is visible via the beam splitter.

11. The non-transitory computer-readable medium of claim 10, wherein:
  the digital element is a first digital element;
  the reflected imagery is first reflected imagery of the first digital element; and
  the instructions, when executed by the processing circuitry, are configured to cause the processing circuitry to perform operations comprising generating the image data to cause display of a second digital element in the virtual area, wherein second reflected imagery of the second digital element is visible via the beam splitter and occludes the first reflected imagery of the first digital element.

12. The non-transitory computer-readable medium of claim 10, wherein transmitting the image data comprises displaying the digital element such that the reflected imagery of the digital element overlaps with the physical object from a viewing perspective of an observation area.

13. The non-transitory computer-readable medium of claim 11, wherein the instructions, when executed by the processing circuitry, are configured to cause the processing circuitry to perform operations comprising:
  determining a position of the physical object; and
  generating the image data to cause display of the digital element based on the position of the physical object.

14. The non-transitory computer-readable medium of claim 10, wherein generating the image data based on the distortive parameter comprises directing an image through an additional physical object disposed in the virtual area, wherein the additional physical object comprises an additional distortive parameter corresponding to the distortive parameter.

15. The non-transitory computer-readable medium of claim 14, wherein the instructions, when executed by the processing circuitry, are configured to cause the processing circuitry to perform operations comprising:
  determining a position of the physical object; and
  instructing an actuator to move the additional physical object to align the digital element with the image data such that the reflected imagery of the digital element overlaps with the physical object from a viewing perspective of an observation area.

16. The non-transitory computer-readable medium of claim 10, wherein the instructions, when executed by the processing circuitry, are configured to cause the processing circuitry to perform operations comprising:
  receiving data indicative of the distortive parameter from a sensor; and
  generating the image data based on the received data.

17. The non-transitory computer-readable medium of claim 10, wherein generating the image data comprises modifying a geometry, a continuity, an orientation, or a combination thereof of a base image based on the distortive parameter.

18. A method for operating a Pepper's Ghost effect system, comprising:
  receiving, via a processor, image data;
  determining, via the processor, a distortive parameter associated with a physical object disposed in a viewing area;
  adjusting, via the processor, the image data based on the distortive parameter and projecting the image data from a virtual area onto a beam splitter such that corresponding display of reflected imagery of the image data is provided on the beam splitter in alignment with the physical object, wherein the beam splitter is positioned between the viewing area and an observation area.

19. The method of claim 18, wherein adjusting the image data based on the distortive parameter comprises at least partially inverting the image data.

20. The method of claim 18, wherein determining the distortive parameter comprises determining a refractive index with a refractometer and/or determining a transparency level with a transparency meter.

* * * * *